(12) United States Patent
Itahara

(10) Patent No.: US 6,691,262 B1
(45) Date of Patent: Feb. 10, 2004

(54) METHOD AND APPARATUS FOR QUALITY EVALUATION OF CABLE CIRCUIT

(75) Inventor: Hiroshi Itahara, Kanagawa (JP)

(73) Assignee: Anritsu Corporation, Tokyo (JP)

(*) Notice: Subject to any disclaimer, the term of this patent is extended or adjusted under 35 U.S.C. 154(b) by 0 days.

(21) Appl. No.: 09/719,131
(22) PCT Filed: Apr. 27, 2000
(86) PCT No.: PCT/JP00/02786
§ 371 (c)(1),
(2), (4) Date: Dec. 8, 2000
(87) PCT Pub. No.: WO00/67392
PCT Pub. Date: Nov. 9, 2000

(30) Foreign Application Priority Data

Apr. 30, 1999 (JP) .......................... 11-124029

(51) Int. Cl.[7] .......................... G06F 11/00; G01R 29/26
(52) U.S. Cl. .......................... 714/705; 714/712; 714/812; 714/819; 324/539; 324/614
(58) Field of Search .......................... 714/705, 712, 714/739, 817; 375/229, 232, 233, 350; 333/12, 181, 185; 439/260; 324/72.5, 522, 530, 538, 539

(56) References Cited

U.S. PATENT DOCUMENTS 5,390,199 A  2/1995  Ajima et al. .......................... 714/819
6,448,863 B1 * 9/2002  Ogawa et al. .......................... 333/12
6,477,199 B1 * 11/2002 Agazzi et al. .......................... 375/232

FOREIGN PATENT DOCUMENTS

JP  10-41862   2/1998
JP  11-55164   2/1999

* cited by examiner

Primary Examiner—Emmanuel L. Moise
(74) Attorney, Agent, or Firm—Frishauf, Holtz, Goodman & Chick, P.C.

(57) ABSTRACT

A cable line quality evaluating method for evaluating a quality of a cable line for transmitting a digital modulation signal in a bidirectional manner comprises the steps of extracting a noise signal of an upstream line from one of a cable line connection point for evaluating a head end of the cable line evaluated in the quantity and the cable line evaluated in the quantity and a connection point between a tap-off and the cable line evaluated in the quality, generating a pseudo random signal, modulating a carrier signal of its predetermined frequency by means of the pseudo random signal, and then outputting the modulated signal as a test carrier, outputting an output signal obtained by adding the noise signal of the upstream line and the test carrier, selectively receiving the signal of its predetermined frequency from the output signal, and modulating the selectively received signal, and comparing the modulated signal with the pseudo random signal in bits, and then measuring a bit error rate.

20 Claims, 4 Drawing Sheets

METHOD AND APPARATUS FOR QUALITY EVALUATION OF CABLE CIRCUIT

CROSS REFERENCE TO RELATED APPLICATION

This application is a U.S. National Phase Application under 35 USC 371 of International Application PCT/JP00/02786 (not published in English) filed Apr. 27, 2000.

TECHNICAL FIELD

The present invention pertains to a method and apparatus for evaluating the quality of a cable line. In particular, the present invention relates to a method and apparatus for evaluation of the quality of a cable line employing a technique for efficiently and precisely evaluating the quality of a cable line for transmitting a digital modulation signal.

BACKGROUND ART

A CATV network achieved to overcome difficulty in audio and visual broadcasting, for example, is configured as shown in FIG. 6.

That is, in this CATV network, one coaxial cable 2 connected to a head end 1 of a center is branched in a tree shape in order to distribute a broadcasting signal to a number of subscribers with a small number of cables.

Image receiving terminals of subscribers can be connected to subscriber' terminals 2a, 2a, . . . of their tip ends (reference numeral 2 in the figure denotes a tap-off that is a branch node).

This CATV network has been initially utilized as a unidirectional network for distributing a broadcasting signal to each subscriber.

Hence, in such CATV network as well, in recent years, the construction of a bidirectional network has been developed so that data can be transmitted from a subscriber to the center by utilizing a dummy frequency bandwidth as a upstream line.

In the meantime, in the CATV network having its tree shaped transmission path as described above, a life noise 'n' of the upstream line frequency bandwidth generated by the home electric equipment of each subscriber (for example, noise generated by turning ON/OFF micro-oven or refrigerator compressor or the like) is unavoidably superimposed over one coaxial cable 2.

The degraded quality of a cable line caused by a noise signal N superimposed over this coaxial cable 2 being transmitted to a head end 1 is problematic.

That is, this noise signal N is called an ingress noise, and its level or frequency-distribution greatly differs depending on network environment, and varies with an elapse of time, which is the primary factor that prevents the construction of a bidirectional CATV network.

Because of this, in the case where the existing CATV network is constructed as a bidirectional network or in the case where a bidirectional CATV network is newly constructed, it is required to initially investigate whether or not an upstream line can be laid to prevent this ingress noise.

In order to investigate this, conventionally, as shown in FIG. 6, a spectrum analyzer 5 (instrument capable of monitoring the noise level of each frequency) has been connected to the head end terminal of the coaxial cable 2 so as to monitor the ingress noise N of the upstream line over a long period of time.

Then, statistic processing has been performed for the monitoring result, and it has been judged whether or not the upstream line is available, namely, whether or not an S/N corresponding to a predetermined error rate can be fully ensured by predetermined limited signal power against the ingress noise N.

In the case where it is judged that an upstream line is available, a test carrier 'St' modulated by a digital signal of its predetermined pattern is inputted from the subscriber's terminal 2a of the coaxial cable 2, as shown in FIG. 7.

This test carrier 'St' is received and demodulated at the head end 1 together with the ingress signal N.

At the head end 1, for example, as in a code error detecting system disclosed in the U.S. Pat. No. 5,390,199, a demodulated signal is compared in bits by using a pseudo random signal, the error rate of this modulated signal is measured, and the line quality between each subscriber's terminal 2a and the head end 1 is individually evaluated in a state similar to actual operation state.

However, in the method of judging the availability based on the level of the ingress noise as described previously, there is a possibility of mistaken judgment.

This is because the ingress noise N is likely to include a periodic noise component or a pulse-like noise component as well as white color noise free of self correlation.

That is, a correlation between the S/N of a signal transmitted by the coaxial cable 2 and the error rate thereof cannot be obtained due to a number of such noise components.

Namely, assuming that a sufficient S/N can be ensured, even if the test carrier 'St' is actually inputted from the subscriber's terminal 2a, as shown in FIG. 7, a desired error rate cannot be obtained frequently, thus making it impossible to move to the next test operation stage.

Therefore, it is considered that the test carrier 'St' is initially inputted from the subscriber's terminal 2a, and the error rate is measured without performing monitoring for the ingress noise, as shown in FIG. 7.

Hence, even in the case where there is no possibility that the upstream line is available, measurement of all the subscriber's terminals are wastefully performed, and the efficiency of cable line quality evaluation is very poor.

DISCLOSURE OF INVENTION

It is an object of the present invention to provide a method and apparatus for evaluating the quality of a cable line that solves the aforementioned problem with the prior art, and makes it possible to efficiently and precisely grasp whether or not the line is available in quality.

According to one aspect of the present invention, there is provided a cable line quality evaluating method for evaluating a quality of a cable line for transmitting a digital modulation signal in a bidirectional manner, the method comprising the steps of:

extracting a noise signal of an upstream line from one of a cable line connection point between a head end of a cable line evaluated in the quality and the cable line evaluated in the quality and a connection point between a tap-off and the cable line evaluated in the quality;

generating a pseudo random signal;

modulating a carrier signal of its predetermined frequency by the pseudo random signal to output the carrier signal as a test carrier;

outputting an output signal obtained by adding a noise signal of the upstream line and the test carrier;

selectively receiving the signal of its predetermined frequency from the output signal and demodulating the signal; and comparing the demodulated signal with the pseudo random signal in bits, and then measuring a bit error rate.

According to another aspect of the present invention, there is provided a cable line quality evaluating apparatus for evaluating a quality of a cable line for transmitting a digital modulation signal in a bidirectional manner, the apparatus comprising:

pseudo random signal generating means for generating a pseudo random signal (21);

test carrier generating means (22) for modulating a carrier signal of its predetermined frequency by means of a pseudo random signal from the pseudo random signal generating means, and outputting the modulated signal as a test carrier;

signal adding means (24) connected to one end of the cable line, the signal adding means adding a noise signal on an upstream line of the cable line and a test carrier outputted from the test carrier generating means;

signal receiving means (25) for selectively receiving the signal of its predetermined frequency from an output signal of the signal adding means, and modulating the signal; and error measuring means (26) for comparing a signal demodulated by the signal receiving means with a pseudo random signal outputted from the pseudo random signal generating means in bits, thereby measuring a bit error rate.

BEST MODE FOR CARRYING OUT OF THE INVENTION

Hereinafter, a cable line quality evaluating apparatus to which a cable line quality evaluating method according to one embodiment of the present invention is applied will be described with reference to the accompanying drawings.

Figure 1:
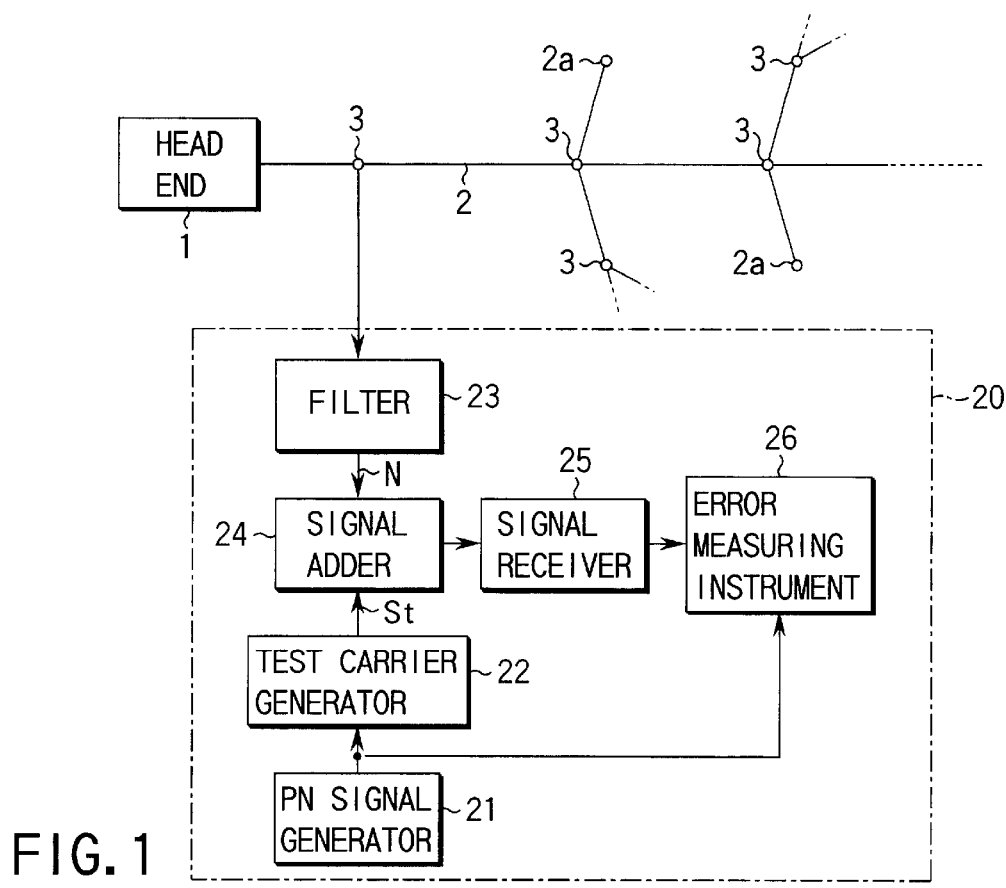
FIG. 1 is a block diagram depicting a configuration of a cable line quality evaluating apparatus to which a cable line quality evaluating method according to one embodiment of the present invention is applied.

FIG. 1 shows a configuration of a cable line quality evaluating apparatus 20 to which a cable line quality evaluating method according to the present embodiment of the present invention is applied.

This cable line evaluating apparatus 20 is adopted to evaluate the quality of a cable line for transmitting a digital modulation signal in a bidirectional manner while the digital modulation signal is not transmitted on the cable line.

This cable line evaluating apparatus 20, as shown here in FIG. 1, evaluates a upstream line of the bidirectional CATV network, and is used by being connected to one end of the head end of a coaxial cable 2 connected to a head end 1 of a center.

A PN signal generator 21 of the cable line quality evaluating apparatus 20 outputs a pseudo random signal of its predetermined period to a test carrier generator 22 and an error measuring instrument 26.

The test carrier generator 22 internally generates a carrier signal at a frequency of its predetermined channel of the upstream frequency bandwidth (for example, in the range of 10 MHz to 50 MHz) of this bidirectional CATV network. In addition, the test carrier generator modulates this carrier signal by means of a pseudo random signal from the PN signal generator 21, and outputs this digital modulation signal as a test carrier 'St'.

This modulation system of the test carrier generator 22 is the same as a modulation system (PSK or FSK) used in the bidirectional CATV network. This modulation system is configured so that an output signal level can be varied manually or by externally controlling the level.

A filter 23 has a bandwidth (for example, 10 MHz to 50 MHz) at which only a signal component of its upward line frequency in the bidirectional CATV network is passed with a small loss. This filter is connected to a branch node (tap-off) 3 at the head end terminal of the coaxial cable 2 to extract an ingress noise N of the upstream line.

In the case where a filter having a bandwidth at which only the signal component of the upstream line frequency is passed with a small loss is incorporated in this branch node (tap-off) 3 itself or in the case where a line with its fixed frequency used for data transmission is targeted for evaluation, a signal adder 24 described later may be connected to a line via the branch node (tap-off) instead of the filter 23.

The signal adder 24 adds the test carrier 'St' outputted from the test carrier generator 22 and the ingress noise N extracted by the filter 23. When a test signal is inputted from the subscriber's terminal, the signal adder generates a signal equivalent to the upstream line signal received at the head end 1.

A signal receiver 25 selectively receives the signal of its predetermined channel from an output signal of the signal adder 24, and demodulates the same.

A frequency of a carrier signal of the test carrier generator 22 and a receiving frequency of the signal receiver 24 may be manually set independently or the test carrier generator and the signal receiver are connected to each other, whereby one may interlock with the other frequency. Further, one may be set at the same frequency by the control of the other one.

In an error measuring instrument 26, for example, as in the aforementioned code error detecting system disclosed in U.S. Pat. No. 5,390,119, a demodulated signal is compared by using pseudo random signal in bits, whereby an error rate of this modulated signal is measured, and the line quality between each subscriber's terminal 2a and the head end 1 is individually evaluated in a state similar to actual operation state.

That is, this error measuring instrument 26 compares a signal demodulated by the signal receiver 25 with a pseudo random signal outputted from the PN signal generator 21 in bits, and then, measures an error rate. Then, the measuring instrument displays the measurement result, and prints it out or outputs it to other device via a communication line.

Thus, in the cable line quality evaluating apparatus 20 to which the cable line quality evaluating method according to the present embodiment of the present invention is applied, the ingress noise N superimposed over the upstream line in the bidirectional CATV network and the generated test carrier 'St' are added by means of the signal adder 24, whereby, when a test signal is inputted from the subscriber's terminal, a signal equivalent to a signal received at the head end 1 is produced, and this added signal is received and demodulated, thereby performing error measurement.

Because of this, without inputting the test signal from each subscriber's terminal, measurement can be performed under a condition that is almost identical to that when a test signal is inputted from the subscriber's terminal. In addition, the upstream line quality can be evaluated precisely and efficiently.

A variety of information concerning cable line quality can be obtained by employing the cable line quality evaluating apparatus 20 to which the cable line quality evaluating method according to the present embodiment is applied.

Now, a description will be given with respect to an evaluation example of the upstream line in the bidirectional CATV network using the cable line quality evaluating apparatus 20 to which the cable line quality evaluating method according to the present embodiment is applied.

Figure 2:
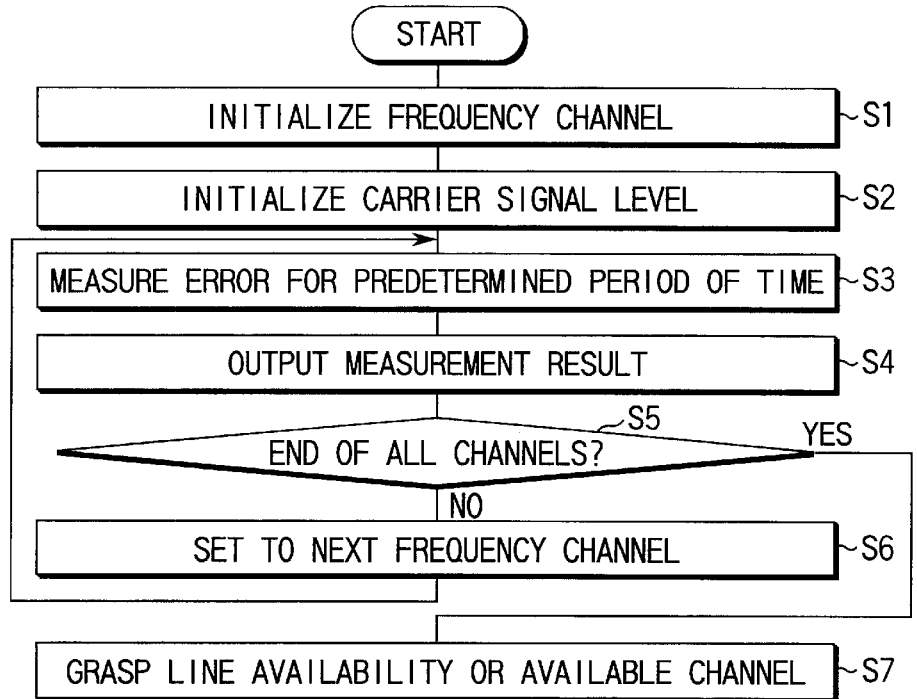
FIG. 2 is a flow chart showing procedures employing the cable line quality evaluating apparatus to which the cable line quality evaluating method according to the present embodiment of the present invention is applied.

FIG. 2 is a flow chart showing procedures for monitoring an error rate while a frequency channel is varied in a state in which the level of the test carrier 'St' is fixed, thereby performing line evaluation in the cable line quality evaluating apparatus 20 to which the aforementioned cable line quality evaluating method is applied.

Initially, the frequency of the carrier signal of the test carrier generator 22 and the receiving frequency of the signal receiver 24 are initialized at a predetermine channel, and the level of the carrier signal of the test carrier generator 22 is set to a predetermined value (steps S1 and S2).

Here, the level of the test carrier 'St' is set to a lower level by a transmission loss L of the upstream line from the subscriber's terminal 2a at the proximal end to the head end 1 relevant to an upper limit level 'Lm' of an output signal of the modem device connected to each subscriber's terminal 2a in the bidirectional CATV network, for example (or an upper limit level of an input signal limited by the network).

This level condition is a maximum level at the head end terminal of the test carrier 'St' inputted from the subscriber's terminal 2a at the proximal end. In the case where the unavailability under this condition is judged, another subscriber's terminal 2a under a condition worse than the above cannot be utilized.

In this state, error measurement is started, the error rate of each unit time is continuously obtained for a predetermined period of time, and the result is printed out (steps S3 and S4).

When this frequency channel measurement has been finished, the similar error measurement is performed for the next frequency channel. Then, the similar processing is performed for up to the last frequency channel (steps S5 and S6).

The thus obtained error measurement result is statistically processed by frequency channel and by day of the week, thereby making it possible to judge whether or not this cable line is currently available or to grasp an available frequency channel, day of the week, and time interval (step S7).

Figure 3A:
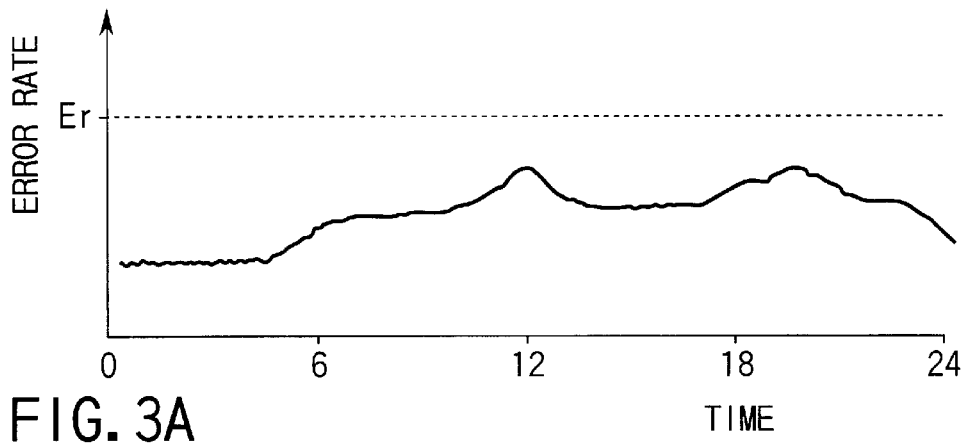
FIG. 3A, FIG. 3B, and FIG. 3C are views each showing an example of the measurement result obtained by employing the cable line quality evaluating apparatus to which the cable line quality evaluating method according to the present embodiment of the present invention is applied.

For example, an average error rate of one day of the week of a frequency channel is equal to or less than a predetermined value 'Er' in all time intervals, as shown in FIG. 3A, it is judged that this frequency channel is always available for use as an upstream line on the day of the week.

Figure 3B:
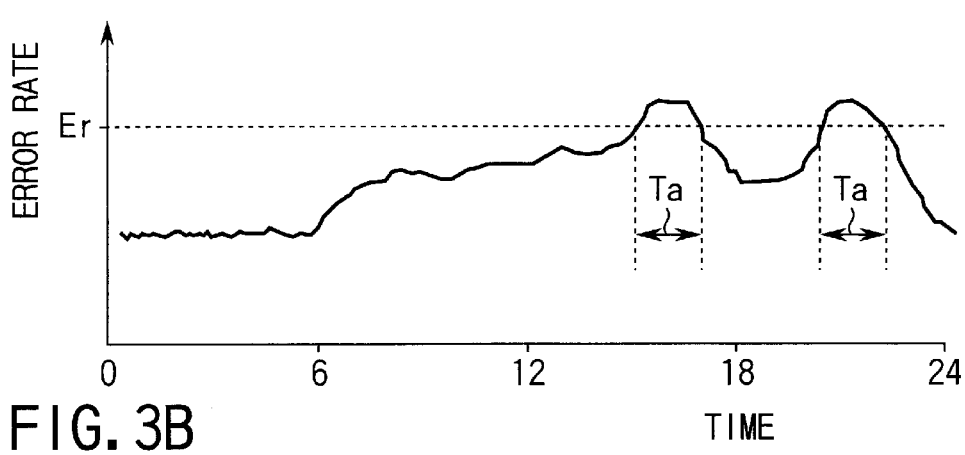

In addition, as shown in FIG. 3B, if the error rate is equal to or less than the predetermined value 'Er' excluding a partial time interval 'Ta', it is judged that the frequency channel is available on the day of the week other than the time interval 'Ta'.

Figure 3C:
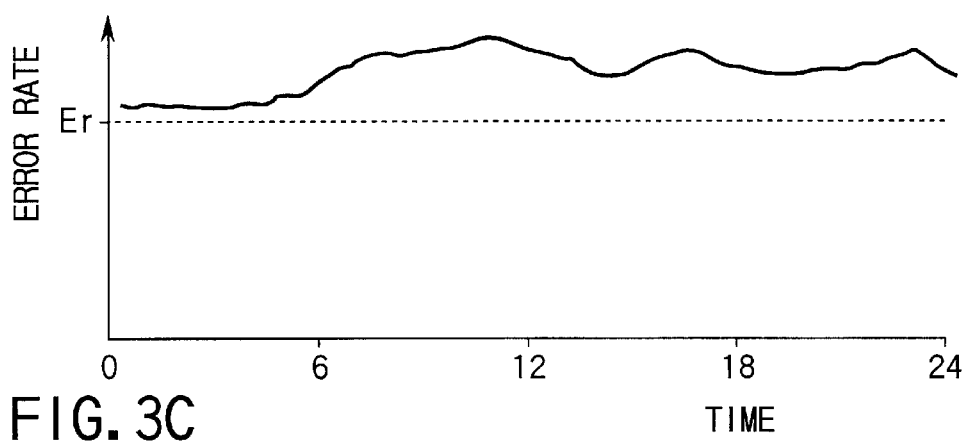

Further, as shown in FIG. 3C, in the case where the error rate exceeds the predetermined value 'Er' at all the time intervals, it is judged that the frequency channel is unavailable on the day of the week.

By performing such judgment, if conditions required for the network upstream line (for example, frequency channels available at all time intervals through one week can be ensured in predetermined number or more) is met, it is judged that the line is available for use as an upstream line.

If conditions required for the network upstream line is not met, it is judged that the line is currently unavailable.

In the case where the unavailability is thus judged, a factor of higher error rate is investigated, and is eliminated or the coaxial cable 2 is laid again.

In this processing shown in FIG. 2, although an error rate is monitored in a state in which the level of the test carrier 'St' is fixed so as to find out the frequency channel, day of the week, and time intervals whose error rate is equal to or less than the predetermined value, a change in level of the test carrier 'St' may be monitored such that the error rate is set to the predetermined value 'Er'.

In this case, an error rate is checked every predetermined time interval (for example, 10 minutes, 30 minutes, or 1 hour and the like) while error measurement is performed at the step S3 shown in FIG. 2. If the error rate is equal to the predetermined value 'Er' or is within the allowable range set relevant to the predetermined value 'Er', the level of the test carrier 'St' is recorded. If the error rate is not equal to the predetermined value 'Er' or is beyond the allowable range, the level of the test carrier 'St' is varied until the error rate has been equal to the predetermined value 'Er' or has been within the allowable range. Then, the level of the test carrier 'St' after varied is recorded.

Such processing is performed by each frequency channel, and the measurement result is statistically processed by frequency channel and by day of the week, whereby a change in level of the test carrier 'St' required for ensuring a predetermined error rate can be recognized.

Figure 4:
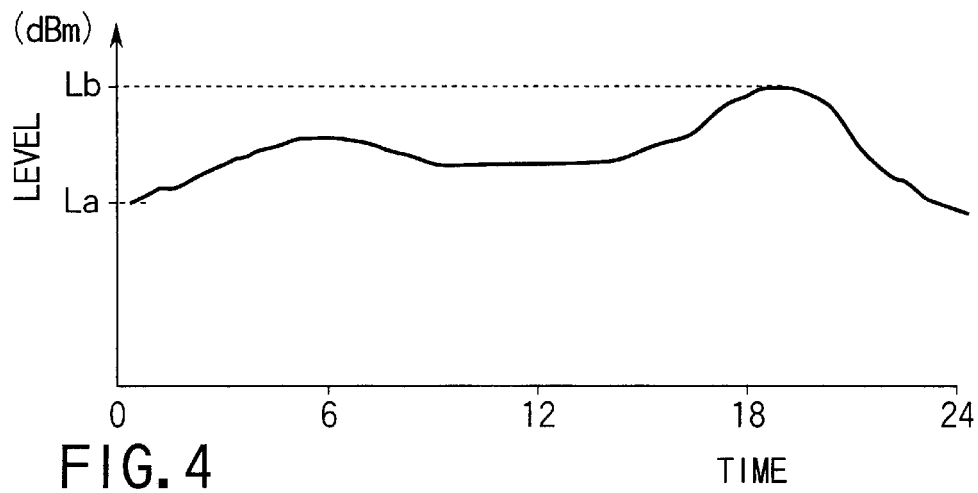
FIG. 4 is a view showing another example of the measurement result obtained by employing the cable line quality evaluating apparatus to which the cable line quality evaluating method according to the present embodiment of the present invention is applied.
Figure 5:
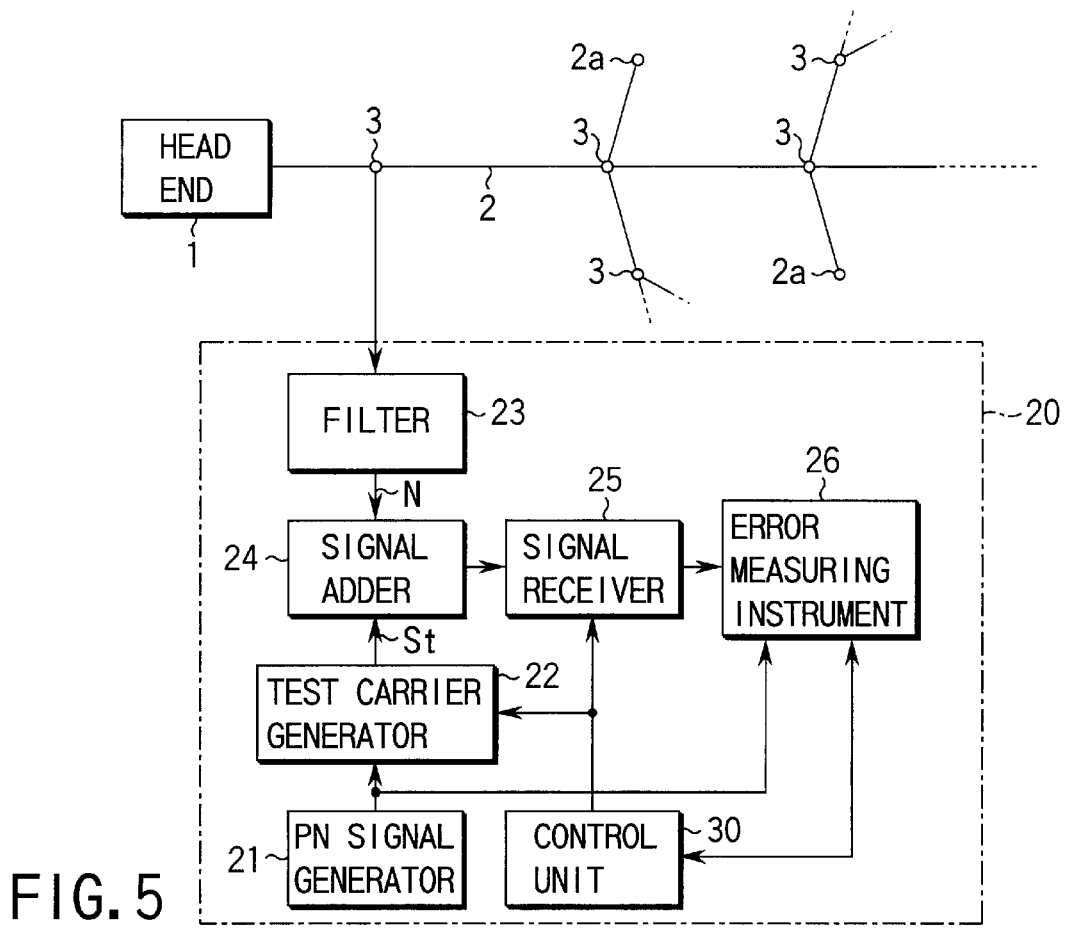
FIG. 5 is a block diagram depicting a configuration when automating the cable line quality evaluating apparatus to which the cable line quality line according to the present embodiment of the present invention is applied.
Figure 6:
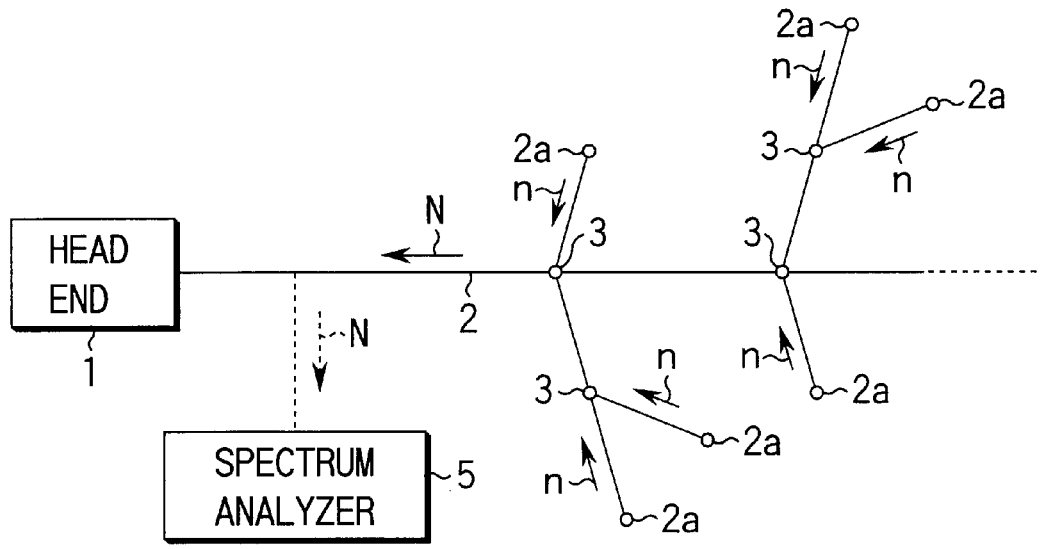
FIG. 6 is a view for illustrating an outline of a bidirectional CATV network and a conventional cable line evaluating method.

For example, in the case where the average level of the test carrier 'St' of day of the week of a frequency channel is obtained as shown in FIG. 4, if a level at which a transmission loss L from the head end 1 to the proximal subscriber's terminal 2a is added 2to the minimum value 'La' is greater than the upper limit level 'Lm' of the output signal of the modem, it can be judged that at least this frequency channel is unavailable for use as an upstream line on the day of the week.

In addition, if a level at which a transmission loss L' from the head end 1 to a distal subscriber's terminal 2a is added to a maximum value 'Lb' is equal to or less than the upper limit level 'Lm' of the output signal of the modem, it can be judged that at least this frequency channel is available for use as an upstream line on the day of the week.

Figure 7:
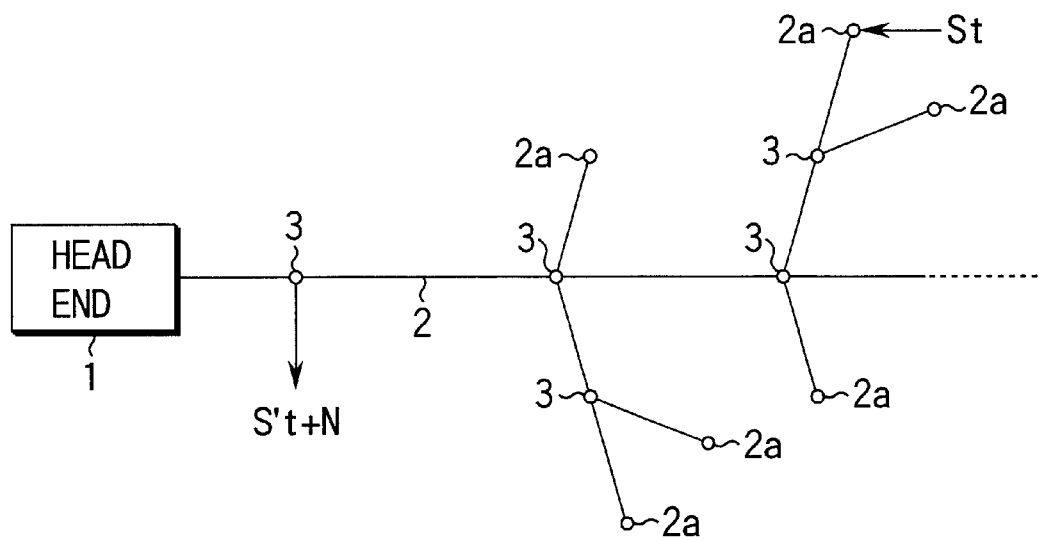
FIG. 7 is a view for illustrating a conventional another cable line evaluating method.

Information on the thus obtained level of the test carrier 'St' can be reflected to an input level of the test carrier during testing at the next stage shown in FIG. 7.

In a series of the foregoing processing steps shown in FIG. 2 and in processing associated with the level variable of the test carrier, there may be manually performed the variable of the frequency channel, the judgment of processing for the measured error rate, the level variable of the test carrier, and the judgment of processing for the level value.

In addition, these processing steps may be automatically performed by means of a control unit 30 that consists of microcomputer or the like.

In this case, in addition to performing frequency channel switching control of the test carrier generator 22 and signal receiver 25 by the control unit 30 or level variable control of the test carrier, there may be performed the judgment of the measurement result of the error controller 26 or line availability based on level variable information and the judgment of available frequency channel, day of the week, time intervals and the like.

Although an upstream line in the bidirectional CATV network has been targeted for evaluation, any line for transmitting a digital modulation signal via a cable can be used equivalently without being limited to the upstream line in the bidirectional CATV network.

As has been described above, in the cable line quality evaluating apparatus to which the cable line quality evaluating method of the present invention is applied, a noise signal at one end terminal of a cable line targeted for evaluation and a generated test carrier are added by signal adding means so that the added signal is received and demodulated, thereby performing error measurement.

According to the cable line quality evaluating apparatus to which the cable line quality evaluating method of the present invention is applied, measurement can be performed without inputting a test signal from the other end of the cable line in a condition that is almost identical to that when the test signal is inputted from the other end terminal. In addition, it can be efficiently and precisely grasped whether or not the line is available in quality.

Therefore, according to the present invention as described above in detail, there can be provided a cable line quality evaluating method and apparatus that solves the aforementioned problem with the prior art, and that makes it possible to efficiently and precisely grasp whether or not the line is available in quality.

What is claimed is:

1. A method for evaluating a quality of a cable line which transmits a digital modulation signal in a bidirectional manner, comprising the steps of:
   extracting a noise signal of an upstream line of the cable line from one connection point of a head end of the cable line to be evaluated and a connection point between a tap-off and the cable line to be evaluated;
   generating a pseudo random signal;
   modulating a carrier signal having a predetermined frequency by means of said pseudo random signal, and then, outputting the modulated signal as a test carrier;
   generating an output signal by adding the noise signal of said upstream line and said test carrier;
   outputting the output signal;
   selectively receiving a signal having a predetermined frequency from said output signal, and demodulating the selectively received signal; and
   comparing said demodulated signal with said pseudo random signal in bits, and then measuring a bit error rate.

2. A cable line quality evaluating method according to claim 1, wherein said bit error rate is monitored while a frequency channel of said predetermined frequency is varied in a state in which a level of said test carrier is fixed, and the quality of said cable line is evaluated.

3. A cable line quality evaluating method according to claim 1, wherein the measurement result of said bit error rate is statistically processed by frequency channel and by day of the week, whereby it is judged as to whether or not the cable line evaluated in said quality is currently available, and an available frequency channel, day of the week, and time intervals are muted.

4. A cable line quality evaluating method according to claim 3, wherein, it an average error rate of a day of the week of a frequency channel is equal to or less than a predetermined value at all time intervals, it is judged that the frequency channel is always available for use as an upstream line on the day of the week.

5. A cable line quality evaluating method according to claim 3, wherein, if an error rate is equal to or less than a predetermined value excluding a partial time interval, it is judged that the frequency channel is available for use a time interval other than said partial time interval.

6. A cable line quality evaluating method according to claim 3, wherein, in the case where an error rate exceeds a predetermined value in all time intervals, it is judged that the frequency channel is unavailable on the day of the week.

7. A cable line quality evaluating method according to claim 3, wherein, if a condition required for an upstream line in a network is met by judging whether or not the line evaluated in said quality is currently available and grasping an available frequency channel, day of the week, and time intervals, it is judged that the cable line is available for use as an upstream line.

8. A cable line quality evaluating method according to claim 7, wherein a condition required for an upstream line in a network includes that a frequency channel available for use in all time intervals through a certain period of time can be ensured in a predetermined number or more.

9. A cable line quality evaluating method according to claim 1, wherein a change in level of said test carrier is monitored such that said bit error rate is equal to a predetermined value, thereby evaluating a cable line evaluated in said quality.

10. A cable line quality evaluating method according to claim 9, wherein, if an error rate is equal to a predetermined value or within an allowable range set to the predetermined value after the error rate has been checked every predetermined period of time during measurement of said bit error rate, a level of a test carrier at that time is recorded; and if the error rate is not equal to the predetermined value or is beyond the allowable range, the level of the test carrier is varied until the error rate has been equal to the predetermined value or has been within the allowable range, processing for recording the level of the test carrier after being varied is performed by each frequency channel, and the measurement result is statistically processed by frequency channel and by day of the week, thereby recognizing a change in level of the test carrier required for ensuring a predetermined error rate.

11. A cable line quality evaluating method according to claim 10, wherein, in the case where an average level of the test carrier on a day of the week of a frequency channel is obtained, if a level obtained by adding a transmission loss from said head end to a proximal subscriber's terminal to the minimum value is greater than an upper limit level of an output signal of a modem connected to each subscriber end, it is judged that at least the frequency channel is unavailable for use as an upstream line on the day of the week.

12. A cable line quality evaluating method according to claim 10, wherein, in the case where an average level of the test carrier on a day of the week of a frequency channel is obtained, if a level obtained by adding a transmission loss from said head end to a proximal subscriber's terminal to the maximum value is equal to or smaller than an upper limit level of an output signal of a modem connected to each subscriber end, it is judged that at least the frequency channel is available for use as an upstream line on the clay of the week.

13. A cable line quality evaluating method according to claim 10, wherein information on the obtained level of the test carrier is reflected in an input level of a test carrier during testing at the next stage.

14. A cable line quality evaluating method according to claim 1, wherein said cable line is laid as a bidirectional CATV network.

15. A cable line quality evaluating apparatus for evaluating a quality of a cable line for transmitting a digital modulation signal in a bidirectional manner, said cable line quality evaluating apparatus comprising:

pseudo random signal generating means for generating a pseudo random signal;

test carrier generating means for modulating a carrier signal having a predetermined frequency by means of a pseudo random signal from said pseudo random signal generating means, and outputting the modulated signal as a test carrier;

signal adding means connected to one end of said cable line, said signal adding means adding a noise signal over an upstream line of the cable line and the test carrier output by said test carrier generating means;

signal receiving means for selectively receiving signal having a predetermined frequency from an output signal of said signal adding means, and then demodulating the selectively received signal; and error measuring means for comparing a signal demodulated by said signal receiving means with a pseudo random signal output from said pseudo random signal generating means, and then, measuring a bit error rate.

16. A cable line quality evaluating apparatus according to claim 15, further comprising a filter connected to one end of said cable line, the filter extracting a noise signal over an upstream line of the cable line, and outputting the extracted noise signal to said signal adding means.

17. A cable line quality evaluating apparatus according to claim 15, whereon said cable line is laid as a bidirectional CATV network.

18. A cable line quality evaluating apparatus according to claim 15, further comprising control means for performing switching control of a frequency channel of said signal receiving means.

19. A cable line quality evaluating apparatus according to claim 15, further comprising control means for performing level variable control of a test carrier by said test carrier generating means.

20. A cable line quality evaluating apparatus according to claim 15, wherein at least one of the judgment of line availability based on the measurement result obtained by said error measuring means or level variable information and the judgment of an available frequency channel, day of the week, and time intervals is performed by said control means.

* * * * *